(12) United States Patent
Gilmore

(10) Patent No.: US 9,906,094 B2
(45) Date of Patent: Feb. 27, 2018

(54) DIRECT DRIVE ACTUATOR WITH SWITCHED RELUCTANCE MOTOR

(71) Applicant: American Axle & Manufacturing, Inc., Detroit, MI (US)

(72) Inventor: Curt D. Gilmore, Fenton, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 391 days.

(21) Appl. No.: 14/663,801

(22) Filed: Mar. 20, 2015

(65) Prior Publication Data
US 2016/0276898 A1    Sep. 22, 2016

(51) Int. Cl.
*H02K 7/06* (2006.01)
(52) U.S. Cl.
CPC .................... *H02K 7/06* (2013.01)
(58) Field of Classification Search
CPC   H02K 7/06; H02K 7/07; H02K 7/075; H02K 41/03; H02K 41/02
USPC ................................................ 310/80, 12.14
See application file for complete search history.

(56) References Cited

U.S. PATENT DOCUMENTS

| | | | |
|---|---|---|---|
| 2,978,621 A * | 4/1961 | Martinek | H02K 7/06 310/75 R |
| 3,065,398 A | 11/1962 | Boy | |
| 3,109,950 A | 11/1963 | Muller | |
| 3,530,321 A | 9/1970 | Reitherman | |
| 5,028,073 A * | 7/1991 | Harms | H02K 7/06 310/156.06 |
| 5,041,748 A | 8/1991 | Huber | |
| 7,482,717 B2 | 1/2009 | Hochhalter et al. | |
| 8,536,750 B2 | 9/2013 | Ai et al. | |
| 2013/0278098 A1* | 10/2013 | Bourqui | H02K 7/06 310/80 |

FOREIGN PATENT DOCUMENTS

| | | |
|---|---|---|
| JP | 2013135560 A | 7/2013 |
| KR | 101086908 B1 | 11/2011 |

* cited by examiner

*Primary Examiner* — Michael Andrews
(74) *Attorney, Agent, or Firm* — Harness, Dickey & Pierce, P.L.C.

(57) ABSTRACT

An actuator having a switched reluctance motor and a plunger assembly. The switched reluctance motor has a stator and a rotor. The stator has a plurality of stator poles and a plurality of stator windings. Each of the stator windings is wound about a corresponding one of the stator poles. The rotor is rotatable about an axis and has a plurality of rotor poles. The plunger assembly has a plunger and at least one spring. The plunger is co-axially received in the rotor and movable in an axial direction along the axis. The at least one spring is disposed in a force transmission path that includes the plunger and is configured to permit movement of the plunger along the axis in opposite axial directions. The plunger assembly is being driven by the rotor.

11 Claims, 3 Drawing Sheets

DIRECT DRIVE ACTUATOR WITH SWITCHED RELUCTANCE MOTOR

FIELD

The present disclosure relates to a direct drive actuator with a switched reluctance motor.

BACKGROUND

This section provides background information related to the present disclosure which is not necessarily prior art.

Actuators are ubiquitous in automotive vehicles and commonly employ a source of rotary power to cause translation of an output member of the actuator. While such actuators are suited for their intended purpose, there remains a need in the art for an actuator that compact and relatively inexpensive, yet capable of producing relatively high axial forces.

SUMMARY

This section provides a general summary of the disclosure, and is not a comprehensive disclosure of its full scope or all of its features.

In one form, the present teachings provide an actuator having a switched reluctance motor and a plunger assembly. The switched reluctance motor has a stator and a rotor. The stator has a plurality of stator poles and a plurality of stator windings. Each of the stator windings is wound about a corresponding one of the stator poles. The rotor is rotatable about an axis and has a plurality of rotor poles. The plunger assembly has a plunger and at least one spring. The plunger is co-axially received in the rotor and movable in an axial direction along the axis. The at least one spring is disposed in a force transmission path that includes the plunger and is configured to permit movement of the plunger along the axis in opposite axial directions. The plunger assembly is being driven by the rotor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
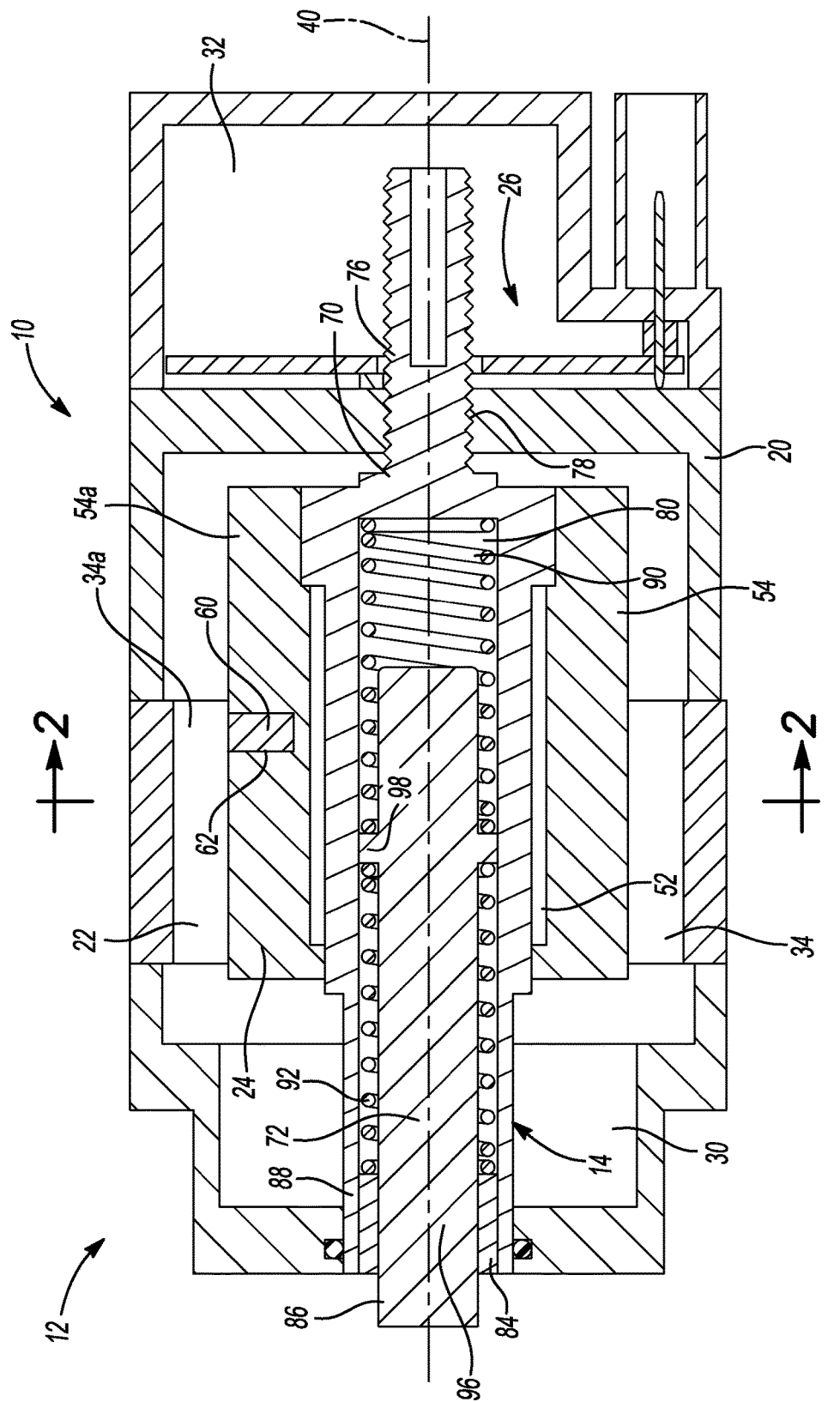
FIG. 1 is a longitudinal cross-section view of a first actuator constructed in accordance with the teachings of the present disclosure.
Figure 2:
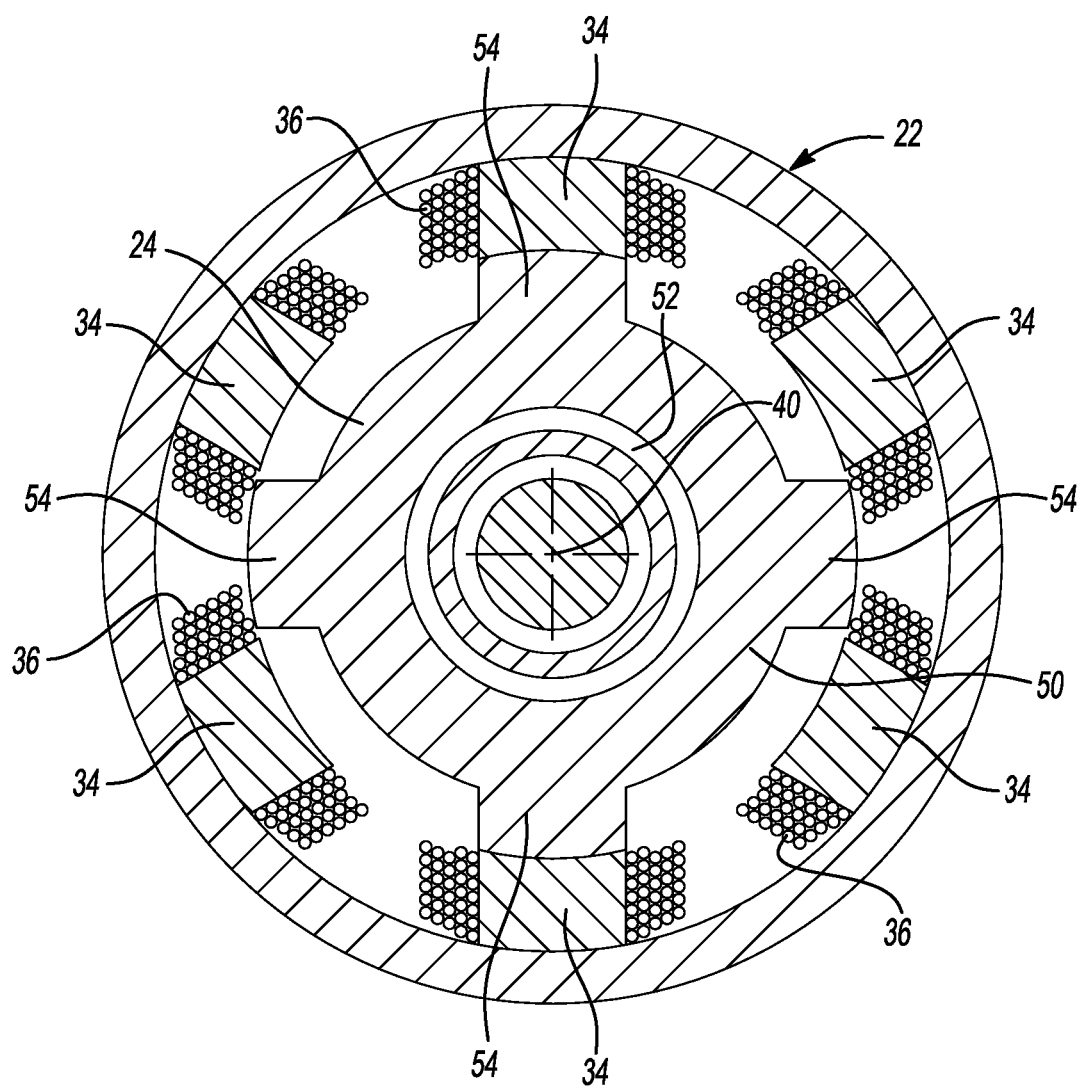
FIG. 2 is a section view taken along the line 2-2 of FIG. 1.

With reference to FIGS. 1 and 2, an actuator constructed in accordance with the teachings of the present disclosure is generally indicated by reference numeral 10. The actuator 10 can include a switched reluctance motor 12 and a plunger assembly 14.

The switched reluctance motor 12 can include a housing 20, a stator 22, a rotor 24 and a controller 26. The housing 20 can define a motor cavity 30, which is configured to house the stator 22, the rotor 24 and the plunger assembly 14, and a controller cavity 32 that is configured to house the controller 26. The stator 22 is fixedly coupled to the housing 20 and includes a plurality of stator poles 34 and a plurality of stator windings 36. The stator poles 34 can be formed of a ferro-magnetic material, such as iron. The stator poles 34 can be spaced circumferentially apart about a rotational axis 40 of the rotor 24 and can extend generally parallel to the rotational axis 40. Each of the stator windings 36 can be wound about a corresponding one of the stator poles 34. The stator windings 36 can be electrically coupled in pairs that are directly across the rotational axis 40 from one another. The rotor 24 can be formed of a ferro-magnetic material, such as iron, and can define a central portion 50, which can define a rotor bore 52, and a plurality of rotor poles 54. The rotor poles 54 can be spaced circumferentially apart from one another and can extend radially outwardly from the central portion 50. In the example provided, the rotor 24 is configured to be movable in an axial direction along the rotational axis 40 and as such, the rotor 24 is longer in length than the stator poles 34. The controller 26 is configured to control the flow of power through the pairs of stator windings 36 based on a rotational position of the rotor 24. The controller 26 is conventional in its configuration and operation and as such, need not be described in detail herein.

With specific reference to FIG. 1, the rotor 24 can optionally include a magnet 60 that can be fixedly mounted to a portion of the rotor 24, such as in one of the rotor poles 54a. The magnet 60 can emit a magnetic field that can draw the rotor pole 54a into alignment with an adjacent one of the stator poles 34a. In the particular example provided, the magnet 60 is shaped as a cylinder and is received in a hole 62 in the rotor pole 54a that extends perpendicular to the rotational axis 40. The magnet 60 can be secured to the rotor 24 in any desired manner, such as by an epoxy adhesive. The magnetic coupling of the magnet 60 with the adjacent one of the stator poles 34 can generate a holding force that can be sufficient in magnitude to resist rotation of the rotor 24 relative to the stator 22 when the switched reluctance motor 12 is not in operation.

The plunger assembly 14 can be driven by the rotor 24 and can include a jackscrew 70, a plunger 72 and at least one spring. The jackscrew 70 can be received into the rotor bore 52 and can be non-rotatably coupled to the rotor 24. In the particular example provided, the jackscrew 70 is fixedly and non-rotatably coupled to the rotor 24 so that the rotor 24 and the jackscrew 70 are both capable of translating along the rotational axis 40, but it will be appreciated that the jackscrew 70 could be non-rotatably but axially slidably mounted to the rotor 24 in the alternative so that axial translation of the rotor 24 relative to the stator 22 would not be necessary. The jackscrew 70 can comprise a threaded section 76, which can be threadably engaged with a threaded hole 78 formed in the housing 20.

One of the jackscrew 70 and the plunger 72 can be slidably received in the other one of the jackscrew 70 and the plunger 72 such that the plunger 72 is co-axially received in the rotor bore 52 in the rotor 24 and is movable relative to the housing 20 along the rotational axis 40. In the particular example provided, the jackscrew 70 defines a plunger cavity 80 that extends along the rotational axis 40 and slidably receives the plunger 72. An end of the jackscrew 70 opposite the threaded section 76 can be supported for rotation about the rotational axis 40. For example, a bearing or bushing (not shown) between the housing 20 and the jackscrew 70 or between the rotor 24 and the jackscrew 70 can be employed to support the end of the jackscrew 70 that is opposite the threaded section 76. A bearing or bushing 84 can be employed to support a distal end 86 of the plunger 72 relative to the distal end 88 of the jackscrew 70. The bearing or bushing 84 can be configured to permit sliding motion of the plunger 72 along the rotational axis 40 relative to the jackscrew 70 and/or the housing 20.

The at least one spring can be disposed in a force transmission path between the housing 20 and the plunger 72 and is configured to permit a degree of axial movement of the plunger 72 along the rotational axis 40 in two directions (i.e., toward and away from the jackscrew 70). In the particular example provided, the at least one spring comprises a first compression spring 90, which is disposed axially between the plunger 72 and a portion of the jackscrew 70 adjacent the threaded section 76, and a second compression spring 92 that is disposed axially between the plunger 72 and a stationary structure located proximate the distal end 86 of the plunger 72, such as the bearing or bushing 84. The first and second compression springs 90 and 92 can be configured to exert axially directed forces onto the plunger 72 in any desired manner, but in the particular example provided, the plunger 72 includes a body portion 96 onto which the first and second compression springs 90 and 92 are co-axially mounted, and an annular spring flange 98 against which the first and second compression springs 90 and 92 are abutted (on opposite axial sides of the spring flange 98).

In operation, rotation of the rotor 24 about the rotational axis 40 causes corresponding rotation of the jackscrew 70. Because the threaded section 76 of the jackscrew 70 is threadably engaged to the housing 20, rotation of the jackscrew 70 will also cause corresponding translation of the jackscrew 70 (and the rotor 24) along the rotational axis 40. In situations where the plunger 72 is not able to translate with the jackscrew 70, one of the first and second compression springs 90 and 92 can deflect so as to permit relative axial motion between the jackscrew 70 and the plunger 72. For example, if the jackscrew 70 were to be translating to the left in FIG. 1 when the plunger 72 has contacted an immovable structure (not shown), the first compression spring 90 can deflect (i.e., compress) between the spring flange 98 and the jackscrew 70 to permit axial movement of the jackscrew 70 toward the plunger 72. Similarly, if the jackscrew 70 were to be translating to the right in FIG. 1 when the plunger 72 is coupled to an immovable structure (not shown) the second compression spring 92 can deflect (i.e., compress) between the bearing or bushing 84 and the spring flange 98 to permit axial movement of the jackscrew 70 away from the plunger 72.

Figure 3:
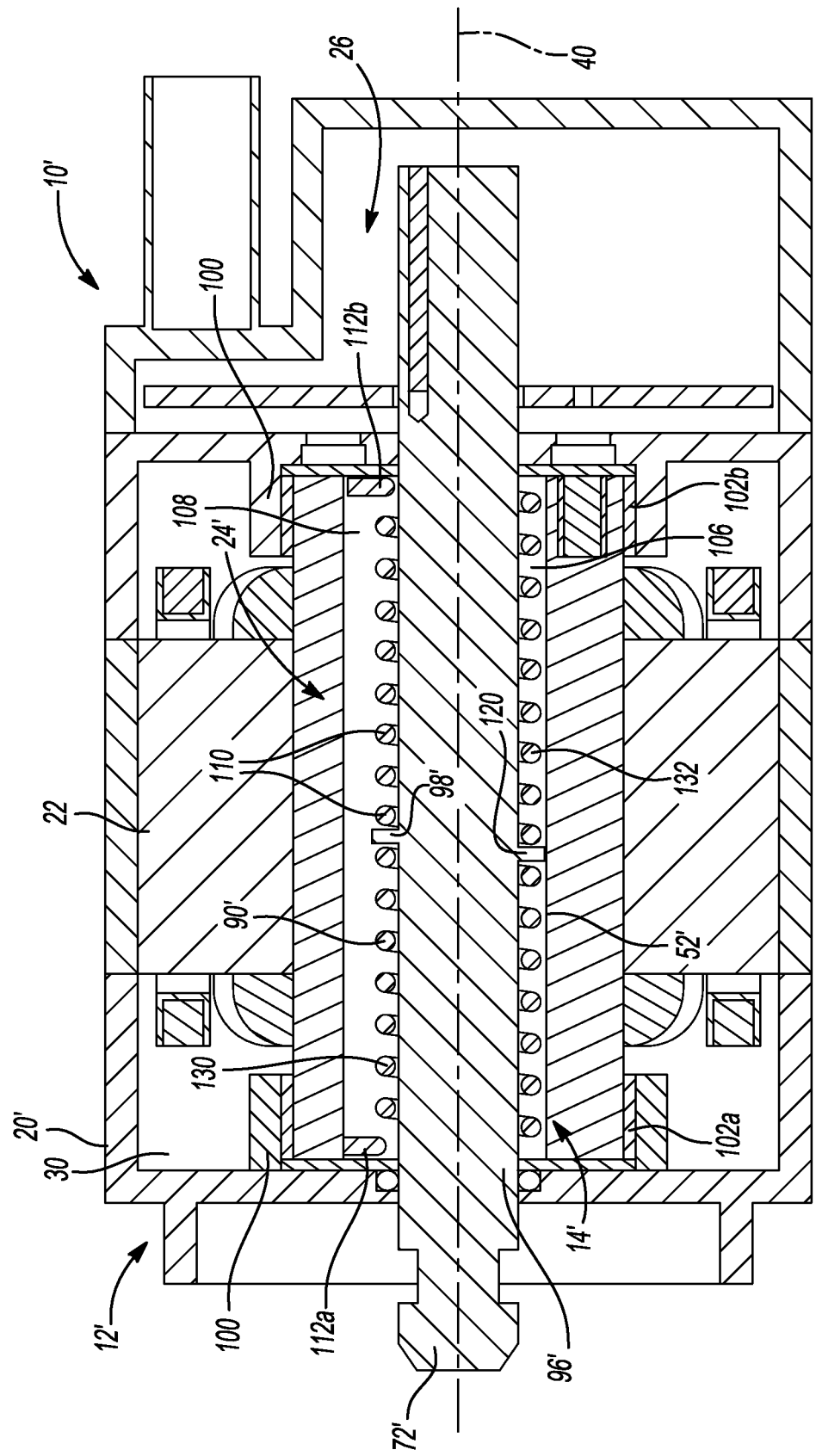
FIG. 3 is a longitudinal cross-section view of a second actuator constructed in accordance with the teachings of the present disclosure.

While the actuator 10 has been described as having a jackscrew 70 that is threadably coupled to the housing 20, it will be appreciated that the actuator could be constructed somewhat differently. In FIG. 3, another actuator constructed in accordance with the teachings of the present disclosure is generally indicated by reference numeral 10'. The actuator 10' can include a switched reluctance motor 12' and a plunger assembly 14'.

The switched reluctance motor 12' can include a housing 20', the stator 22, a rotor 24' and the controller 26. The housing 20' can be generally similar to the housing 20 (FIG. 1) described above, except that the housing 20' can define a pair of bearing mounts 100 that can be disposed in the motor cavity 30. The rotor 24' can be generally similar to the rotor 24 (FIG. 1) described above, except that the rotor 24' can be mounted on a pair of bearings 102a, 102b that are received on the bearing mounts 100 (so that the rotor 24' is not movable in an axial direction along the rotational axis 40) and the rotor bore 52' can have a generally cylindrical portion 106 and a slotted portion 108 that can intersect the generally cylindrical portion 106. Optionally, the magnet (not specifically shown) can be mounted to the rotor 24' at a desired location and can be configured to generate a holding force that can resist rotation of the rotor 24' relative to the stator 22.

The plunger assembly 14' can include at least one spring and a plunger 72'. In the example provided, the at least one spring consists of a single compression spring 90' having a plurality of helical coils 110 and tangs 112a, 112b formed on the opposite axial ends of the single compression spring 90'. The tangs 112a, 112b can extend radially outwardly from the helical coils 110. The single compression spring 90' can be received co-axially into the rotor 24' such that the helical coils 110 are received in the generally cylindrical portion 106 of the rotor bore 52' and the tangs 112a, 112b are received into the slotted portion 108. Accordingly, it will be appreciated that receipt of the tangs 112a, 112b in the slotted portion 108 couples the single compression spring 90' to the rotor 24' for common rotation. The plunger 72' can have a plunger body 96' and a spring flange 98'. The plunger body 96' can be received into the helical coils 110 of the single compression spring 90' and can be non-rotatably but axially movably coupled to the housing 20'. The spring flange 98' can define a helical threadform 120 that can be threaded into the helical coils 110.

In operation, rotation of the rotor 24' about the rotational axis 40 causes corresponding rotation of the single compression spring 90'. Because the helical threadform 120 of the spring flange 98' is threadably engaged to the helical coils 110, rotation of the helical coils 110 will also cause corresponding translation of the plunger 72' along the rotational axis 40. In situations where the plunger 72' is not able to translate as the rotor 24' and helical coils 110 rotate, a portion of the single compression spring 90' can deflect so as to permit relative axial motion between the plunger 72' and the rotor 24'. For example, if the rotor 24' were to be rotating in a first rotational direction that would ordinarily cause the plunger 72' to translate to the left in FIG. 3 and the plunger 72' was in contact with an immovable structure (not shown) that prevented further movement of the plunger 72' toward the left in FIG. 3, helical coils 110 from the portion 130 of the single compression spring 90' between the tang 112a and the helical threadform 120 can be wound into the space in the generally cylindrical portion 106 of the rotor bore 52' and can be compressed between the bearing 102b and the threadform 120 so as to permit rotational movement of the rotor 24' and the single compression spring 90' in the first rotational direction when the plunger 72' was not movable to the left in FIG. 3. Similarly, if the rotor 24' were to be rotating in a second rotational direction opposite the first rotational direction (which would ordinarily cause the plunger 72' to translate to the right in FIG. 3) and the plunger 72' was coupled to an immovable structure (not shown) that prevented movement of the plunger 72' to the right in FIG. 3, helical coils 110 from the portion 132 of the single compression spring 90' between the tang 112b and the helical threadform 120 can be wound into the space in the generally cylindrical portion 106 of the rotor bore 52' and can be compressed between the bearing 102a and the threadform 102 so as to permit rotational movement of the rotor 24 and the single compression spring 90' in the second rotational direction when the plunger 72' was not movable to the right in FIG. 3.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An actuator comprising:
   a switched reluctance motor having a motor housing, a stator and a rotor, the motor housing defining a motor cavity into which the stator and the rotor are received, the stator having a plurality of stator poles and a plurality of stator windings, each of the stator windings being wound about a corresponding one of the stator poles, the rotor being rotatable about an axis and having a plurality of rotor poles;
   a plunger assembly having a plunger, a jackscrew, and at least one spring, the plunger being co-axially received in the rotor and movable relative to the housing in an axial direction along the axis, the at least one spring being disposed in a force transmission path between the housing and the plunger, the at least one spring being configured to permit movement of the plunger along the axis in opposite axial directions, the plunger assembly being driven by the rotor, the jackscrew being threadably coupled to the motor housing and configured to move axially along the axis in response to rotation of the rotor.

2. The actuator of claim 1, wherein the jackscrew is non-rotatably coupled to the rotor.

3. The actuator of claim 2, wherein one of the jackscrew and the plunger is slidably received in the other one of the jackscrew and the plunger.

4. The actuator of claim 1, wherein one of the jackscrew and the plunger is slidably received in the other one of the jackscrew and the plunger.

5. The actuator of claim 4, wherein the at least one spring comprises a first compression spring, which is disposed between the plunger and the jackscrew, and a second compression spring that is disposed between the plunger and the housing.

6. The actuator of claim 5, wherein the first and second springs are mounted coaxially onto the plunger.

7. The actuator of claim 4, further comprising a bearing mounted between the plunger and the jackscrew.

8. The actuator of claim 1, wherein the rotor is movable along the axis within the stator.

9. The actuator of claim 1, further comprising a magnet coupled to the rotor, the magnet being oriented toward the stator such that alignment of the magnet to one of the stator poles creates a holding force that resists rotation of the rotor relative to the stator.

10. The actuator of claim 9, wherein the magnet is mounted in a rotor pole.

11. The actuator of claim 9, wherein the magnet contacts a single one of the plurality of rotor poles and does not contact other ones of the plurality of rotor poles.

* * * * *